UNITED STATES PATENT OFFICE.

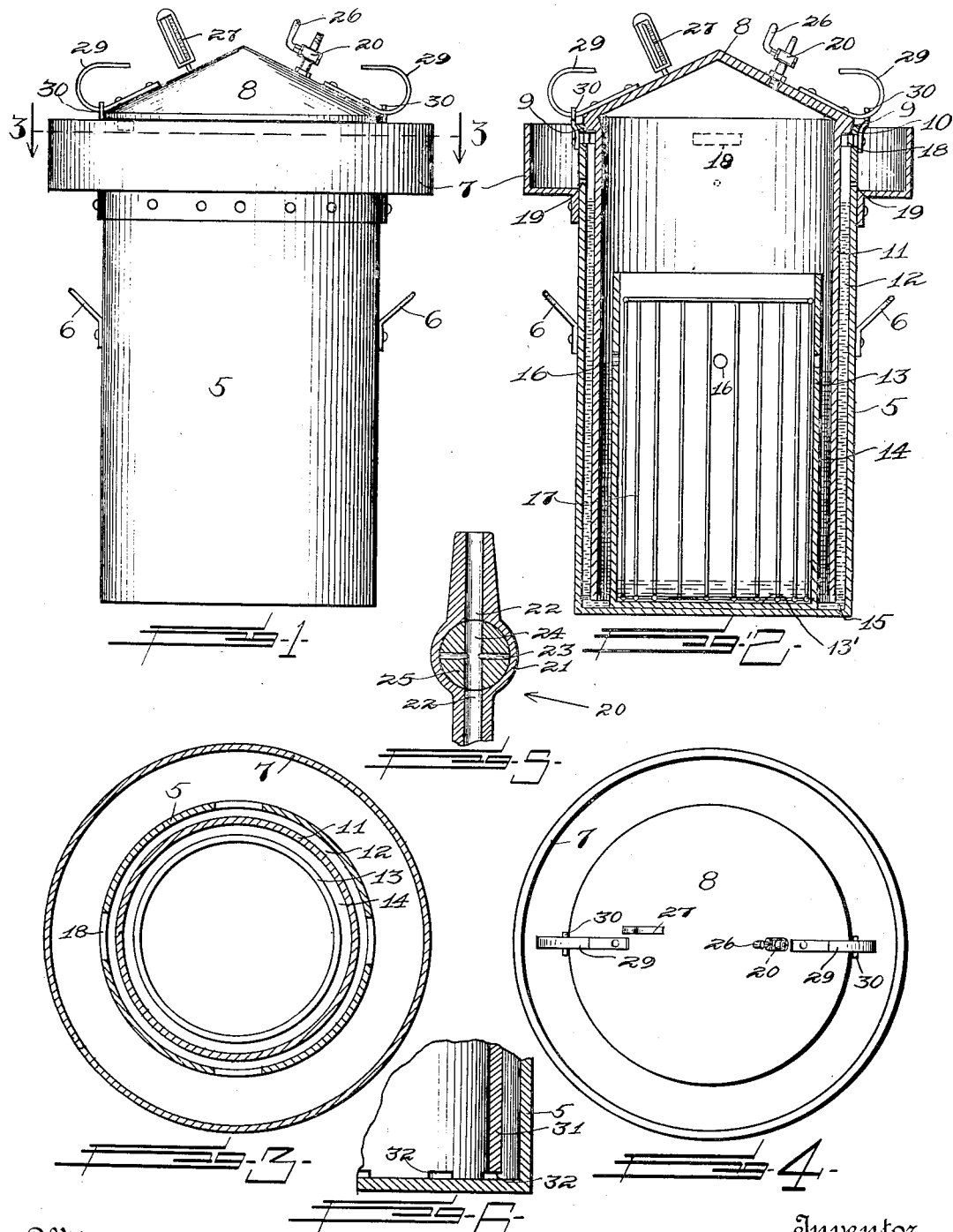

JAMES L. CARBERY, OF ROCK HILL, SOUTH CAROLINA, ASSIGNOR OF ONE-HALF TO CLARENCE L. PARKER, OF WASHINGTON, DISTRICT OF COLUMBIA.

STEAM-COOKER.

1,235,009.     Specification of Letters Patent.     Patented July 31, 1917.

Application filed March 22, 1913. Serial No. 756,242.

*To all whom it may concern:*

Be it known that I, JAMES L. CARBERY, a citizen of the United States, residing at Rock Hill, in the county of York and State of South Carolina, have invented certain new and useful Improvements in Steam-Cookers, of which the following is a specification.

My invention relates to steam cookers primarily designed for thoroughly sterilizing or processing fruits, vegetables or other food products in canning operations whereby all of the bacteria, fungi and the spores thereof, contained within the same will be destroyed, in order that such fruits, vegetables or other food products may be properly preserved, and has particular reference to apparatus of this character which may be satisfactorily operated at different altitudes and consequently under varying atmospheric pressures, even by those unskilled in the art of canning.

An important object of this invention is to provide apparatus of the above mentioned character, wherein means are provided for forming an upstanding column or columns of water, to maintain the pressure within the cooking chamber of the apparatus, about normal atmospheric pressure and substantially constant, such means being also so constructed that the water will not be ejected from the vertical column by the pressure or steam within the cooking chamber and returned thereto in such a way as to cause material fluctuations in the temperature in the cooking chamber.

A further object of this invention is to provide apparatus of the above mentioned character, having pressure reducing or equalizing means, which permits of the normally continuous escape of a relatively small amount of the steam, such means being adapted to be manipulated, whereby the volume of the escaping steam may be increased, upon the increase of the generation of the steam within the apparatus.

A further object of this invention is to provide apparatus of the above mentioned character, which is simple in construction, inexpensive to manufacture, convenient, safe, durable and readily portable.

Other objects and advantages of this invention will be apparent from the following description.

In the accompanying drawings, forming a part of this specification and in which like numerals are employed to designate like parts throughout the same—

Figure 1 is a side view of the complete cooker,

Fig. 2 is a central vertical sectional view therethrough,

Fig. 3 is a horizontal section taken on line 3—3 of Fig. 1,

Fig. 4 is a plan view of the complete cooker,

Fig. 5 is a detail section through the pressure controlling valve, and,

Fig. 6 shows a modified form of depending shell.

In the drawings, wherein for the purpose of illustration, I have shown a preferred embodiment of my invention, the numeral 5 designates an outer shell, which forms the body portion of the apparatus. This shell 5 is preferably cylindrical and vertically disposed when the apparatus is in operation. Connected with the outer shell 5, preferably at diametrically opposite points, are handles 6, as shown. Surrounding the upper end of the outer shell 5 is an annular over-flow or catchment trough or receptacle 7, suitably secured thereto by any desired means. The upper end of the catchment trough or receptacle 7 is preferably formed open, as shown.

The upper end of the outer shell 5 is closed by a separate cover or lid 8, carrying a depending upwardly flaring annular flange 9, to engage within the slightly flaring upper end or mouth 10 of the outer shell 5, to form therewith a substantially or practically steam tight connection or joint. Connected with the cover or lid 8 and depending therefrom is an intermediate tubular casing or shell 11 forming with the lid a bell-structure, the lower end of which is disposed adjacent but spaced from the bottom of the outer shell 5, as shown. The intermediate shell 11 is of smaller diameter than the outer shell 5 and is preferably arranged concentrically with relation thereto, for forming an outer vertical annular chamber for a water column 12. Mounted within the intermediate casing or shell 11 is an inner upstanding casing or shell 13 of still smaller diameter than said intermediate casing or shell 11, as shown. The inner shell 13 is preferably arranged concentrically with relation to the intermediate shell 11 for forming an inner annular chamber for a vertical water column 14, as shown. Said inner shell 13 has its lower end closed by a bottom 13', while its upper end is formed entirely open and arranged wholly within the intermediate shell 11, as shown. The vertical water column 14 has communication with the outer vertical water column 12, at the lower end thereof, as shown at 15. The inner shell 13 is provided with an opening or openings 16, disposed at about one-half the height of the shell 11. Movably mounted within the inner shell 13 are one or more open baskets or containers 17 arranged when more than one are employed, in superposed relation, for holding the cans of fruit or other vegetables to be preserved.

The outer casing or shell 5 is provided near and spaced from the upper end thereof with relatively large outlet openings 18, having free communication with the trough or catchment receptacle 7, as shown. These outlet openings 18 are preferably in the form of horizontal slots, which may advantageously be diametrically oppositely arranged. Disposed near and below each of the relatively large outlet openings 18 is one or more relatively small water return openings or perforations 19, serving to establish communication between the catchment receptacle or trough 7 and the outer vertical column space 12.

The cover or lid 8 may advantageously be provided with a valve structure 20 connected therewith, including a valve casing 21. This valve casing is provided with diametrically oppositely arranged openings 22, adapted for registration with small and large openings 23 and 24, formed through a rotatable valve 25, which is mounted within the shell 21. The valve 25 is turned by means of a handle 26. In operation the valve 25 normally occupies a position so that the small opening 23 is in registration with the openings 22, whereby in the processing operations a small amount of the steam generated within the apparatus is normally constantly escaping. When it is desired to increase this escape of the steam, upon an increased generation of the same, the valve 25 is turned to bring the large opening 24 into partial or total registration with the openings 22, as may be found desirable. The numeral 27 designates a thermometer, suitably connected with the cover or lid 8, for indicating the degree of heat within the apparatus.

Particular attention is called to the fact that the outer shell 5 is substantially tall and the water-seal thereof is accordingly substantially deep. In lowering the intermediate shell 11 into the water of the seal, the air contained within the intermediate shell must escape to the atmosphere, for it would be impossible to lower the intermediate shell, as the apparatus is of substantial size and is ordinarily handled by a single individual, not infrequently the housewife. The valve 25 is now moved to the open position, to allow of this escape of air, and the large opening 24 is preferably brought into registration with the openings 22, as this will allow of the quick discharge of the air while the air may be discharged by bringing the opening 23 into registration with the openings 22. During the cooking operation, it is often desirable to close the valve 25, for building up a suitable pressure within the intermediate shell 11, and this is accomplished by turning the valve 25 for one-fourth of a revolution, covering both openings 23 and 24. It is obvious that the smaller opening 23 may be employed to allow of the slight escape of steam during the cooking process as hereinabove explained.

Rigidly connected with the cover or lid 8 are upwardly curved hooks or brackets 29, which are preferably diametrically oppositely arranged, and adapted to be engaged by inclined hooks 30, rigidly attached to the upper end of the outer shell 5. It is thus seen that by slightly turning the cover or lid 8, the hooks or brackets 29 may be moved into or out of clamping engagement with the stationary hooks 30 to secure the cover or lid tightly upon the upper end or mouth of the outer shell 5.

In Fig. 6, I have shown a different form of intermediate shell 31, all other elements of the apparatus preferably remaining the same. This intermediate shell 31 has its lower end in engagement with the bottom of the outer shell 5, and is provided adjacent the bottom with a preferably horizontal relatively small slot or slots 32, through which the water passes when forced from the inner water column chamber to the outer one. A particular advantage is gained in this construction to wit, owing to the relatively small size of these openings 32 a substantial resistance is offered to the passage of water which is forced by steam pressure from the inner water column chamber to the outer water column chamber, thereby preventing a large amount of water being forcibly or explosively ejected under steam pressure from the inner water column chamber to the outer one and the pressure in the inner chamber suddenly altered thereby.

The operation of the apparatus is as follows:

The entire apparatus may be placed upon a stove, furnace, or the like, or suitably held above a gas burner or open fire. The cans of vegetables or other food products to be preserved are placed within the removable open basket or baskets 17. Water is then poured into the space or annular chamber between the inner shell 13 and outer shell 5 until it is filled up to the opening or openings 16 and sufficient water has flowed into the inner shell 13 through such opening or openings to provide such inner shell with water enough to furnish steam for processing operations, ordinarily, when fruits are to be preserved, to a depth of one to three inches in the inner shell.

Upon the generation of steam within the intermediate shell 11, the steam pressure acting upon the water columns 12 and 14, will force the water column 14 downwardly and the water column 12 upwardly, such water finally discharging principally through the openings 18, to be collected within the catchment receptacle or trough 7. By having the outlet openings 18 relatively large, as shown, I have found that all troublesome spurting or forcible ejectment of the water from the upper end of the water column 12 is overcome. The water, upon the descent of the column, 12 will again pass into the outer shell 5 through the relatively small openings 19, which will admit the slightly cooled water to the apparatus too slowly to materially affect the temperature in the cooking or processing chamber. In practice the valve 25 may advantageously be arranged so that there is a normally continuous escape of steam through the small opening 23 during the processing operation, which opening is of such size as not to reduce the steam pressure below the desired degree, but rather serves to retain the same constant at such desired degree. In the event that the steam should be generated too rapidly by an excessively hot fire, the valve 25 is turned so that the large opening 24 is brought into partial or total registration with the openings 22, thus allowing the steam to escape more rapidly, as may be found necessary.

It will be seen from the foregoing that I have provided a steam cooking apparatus, which will subject the cans or other receptacles containing the material to be preserved, to a desired degree of heat, without requiring a skilled operator and which will not subject the operator to the danger of explosion incident to the use of other steam pressure canners.

While I have shown and described in detail the preferred form of my invention it is to be understood that various changes may be made in the form, size, proportions and details of construction without departure from the spirit of my invention or the scope of the subjoined claims.

Having described my invention, I claim:

1. Apparatus of the character described, comprising an outer shell, an intermediate shell arranged within the outer shell in spaced relation thereto with its lower end terminating near the bottom of the outer shell, and an inner shell arranged within the intermediate shell in spaced relation thereto with its lower end closed and its upper end open and arranged wholly within the intermediate shell, said inner shell being provided near its upper open end with a water inlet opening, the outer shell, intermediate shell, and inner shell, forming a water seal, adapted to be filled by pouring the water between the intermediate shell and inner shell, whereby when a predetermined amount of water has been thus supplied, said water will pass through the inlet opening into the lower closed end of the inner shell, to afford a proper water level therein.

2. In apparatus of the character described, a substantially tall outer shell having its bottom closed and its top open, an inner shell disposed therein in spaced relation thereto and having its bottom closed and its top open, an intermediate shell closed at its top arranged between the outer and inner shells and forming with such outer and inner shells a water seal, the outer column of which is in communication with the atmosphere and the inner column in communication with the interior of the intermediate shell, and a manually operated valve carried by the intermediate shell at its upper portion and adapted to be opened to establish communication between the interior of the intermediate shell and the atmosphere when the intermediate shell is being moved downwardly into the water of the seal and to be closed for maintaining a suitable pressure within the intermediate shell when material is being cooked.

3. In apparatus of the character described, inner and outer spaced shells forming a water space therebetween, an intermediate shell having an open bottom extending within said water space, a trough or catchment receptacle disposed adjacent the upper end of the outer shell, said outer shell being provided with a horizontally disposed slot communicating with the trough or catchment receptacle and a relatively smaller opening in said outer shell disposed below the slot and communicating with the trough or catchment receptacle whereby the liquid ejected from the water space between the two shells will flow outward more rapidly into the trough or catchment receptacle than back from the said trough or catchment receptacle into said water space.

In testimony whereof I affix my signature in presence of two witnesses.

JAS. L. CARBERY.

Witnesses:
L. PARKER,
JAMES L. CRAWFORD.